Feb. 9, 1965 L. LEFEVRE Re. 25,726

HYDRAULIC ENGINE

Original Filed Nov. 21, 1954 4 Sheets-Sheet 1

Feb. 9, 1965 | L. LEFEVRE | Re. 25,726

HYDRAULIC ENGINE

Original Filed Nov. 21, 1954 | 4 Sheets-Sheet 2

INVENTOR

HYDRAULIC ENGINE

Original Filed Nov. 21, 1954 4 Sheets-Sheet 3

HYDRAULIC ENGINE

Original Filed Nov. 21, 1954 4 Sheets-Sheet 4

INVENTOR

Louis Lefevre

United States Patent Office

Re. 25,726

Reissued Feb. 9, 1965

25,726

HYDRAULIC ENGINE

Lorin Lefevre, 2908 1st Ave. N., Great Falls, Mont.

Original No. 3,090,364, dated May 21, 1963, Ser. No. 47,127, Mar. 28, 1960, which is a continuation of Ser. No. 470,155, Nov. 21, 1954. Application for reissue Mar. 5, 1964, Ser. No. 364,871

11 Claims. (Cl. 91—12)

Matter enclosed in heavy brackets [ ] appears in the original patent but forms no part of this reissue specification; matter printed in italics indicates the additions made by reissue.

The present invention relates to an engine, and more particularly to an oscillating or reciprocating engine which utilizes any suitable fluid medium, or pressure medium, such as hydraulic fluid, air, steam or gas, etc.

The within embraced specification represents a continuation of my copending application Serial No. 470,155, filed November 21, 1954, now abandoned, which was a continuation in part of my then copending application Serial No. 381,875, filed September 23, 1953, now abandoned.

Another object of the invention is to provide an engine which utilizes said hydraulic or other pressure mediums and which is susceptible to either manual or automatic control, there being a mechanism provided for automatically reversing the engine and wherein one or more power outlet cylinders can be actuated simultaneously or at spaced intervals.

A further object of the invention is to provide an engine which, when producing rotative power, may be instantaneously reversed as to rotation at any speed or from any point in its rotation.

A further object of the invention is to provide an oscillating or reciprocating engine wherein said reciprocations may be accurately governed.

Another further object of the invention is to provide an oscillating or reciprocating engine which is extremely simple and inexpensive to manufacture.

Other objects and advantages will be apparent during the course of the following description.

In the drawings forming a part of this application, and in which like numerals are used to designate like parts throughout the same:

Figure 3:
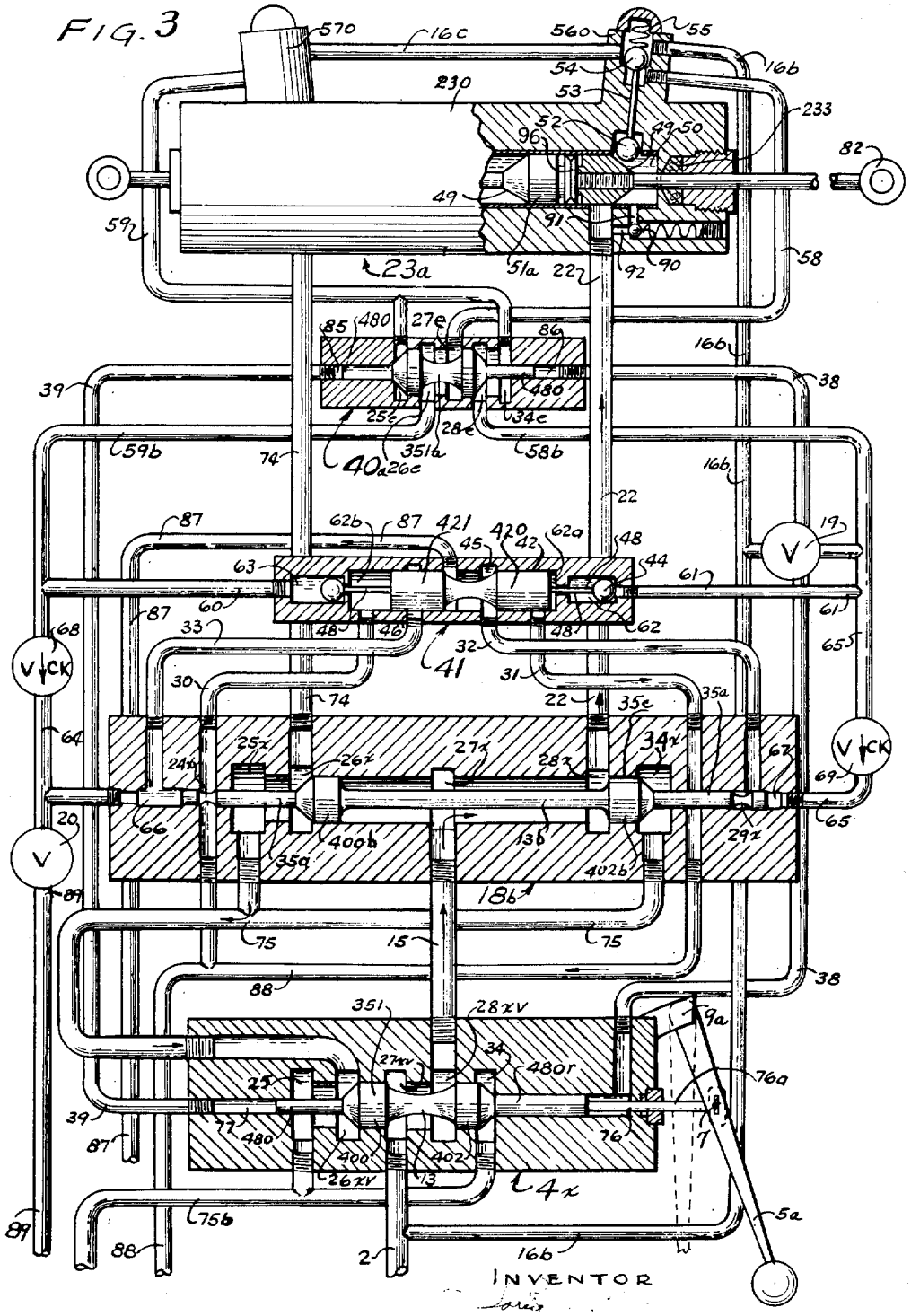

FIG. 3 is a schematic showing of a modified form of the engine of the present invention and being provided with shifter extension pistons extending from the heads of valve spools. FIG. 3 further illustrates a *meting* [metering] device for the *meting* [metering] of an exact amount of fluid to consummate the shifting of a fluid pressure shifted valve member. FIG. 3 additionally illustrates schematically one end of a power cylinder arranged with a cylinder head valve, also schematically shown, while the balance of the power cylinder with its opposite cylinder head valve is a surface view.

Figure 4:
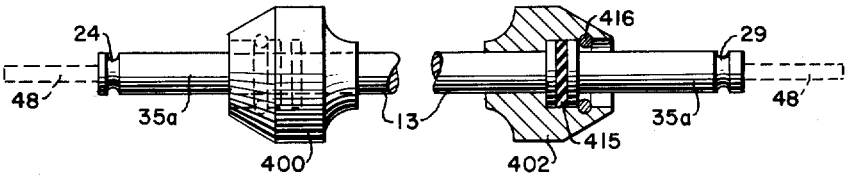

FIG. 4 illustrates schematically in partial cross section, also partially in silhouette, a method for flexibly attaching piston extensions to valve heads or for attaching a piston rod to its piston.

Figure 5:
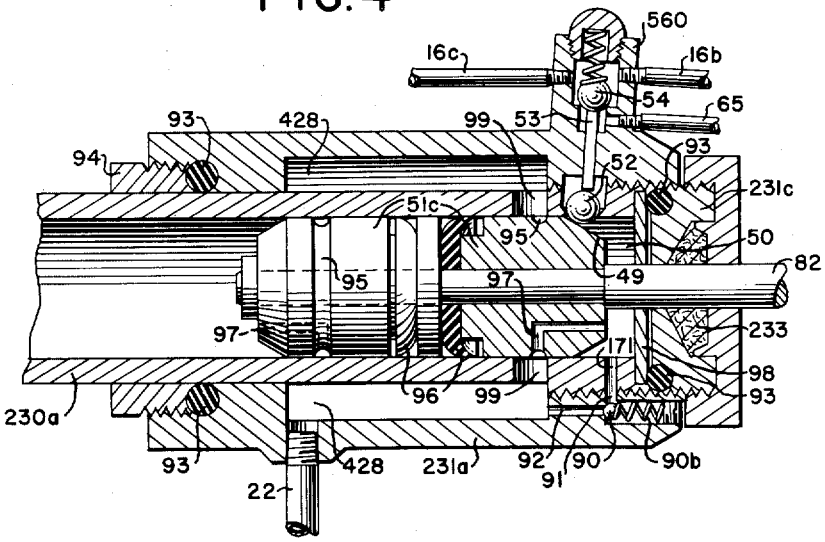

FIG. 5 illustrates schematically one end of a servo motor with a cylinder head valve and being farther provided with a power cylinder employing a jacket.

Figure 6:
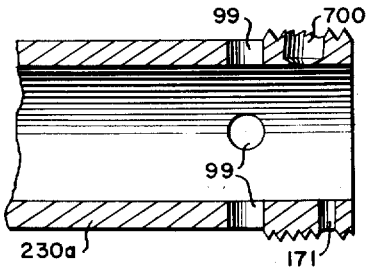

FIG. 6 is a cross sectional view of a cylinder illustrating various ports, etc.

Figure 7:
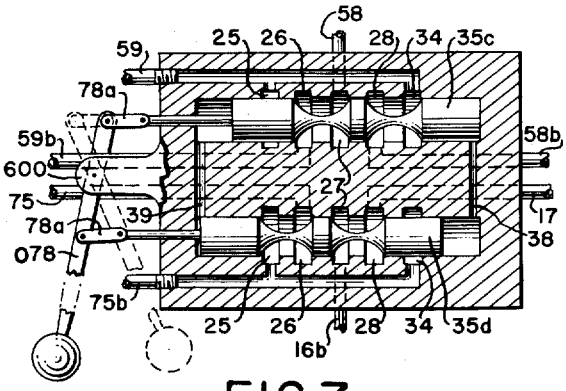

FIG. 7 illustrates schematically a manually operated multiple circuit flow reversing valve.

Figure 1:
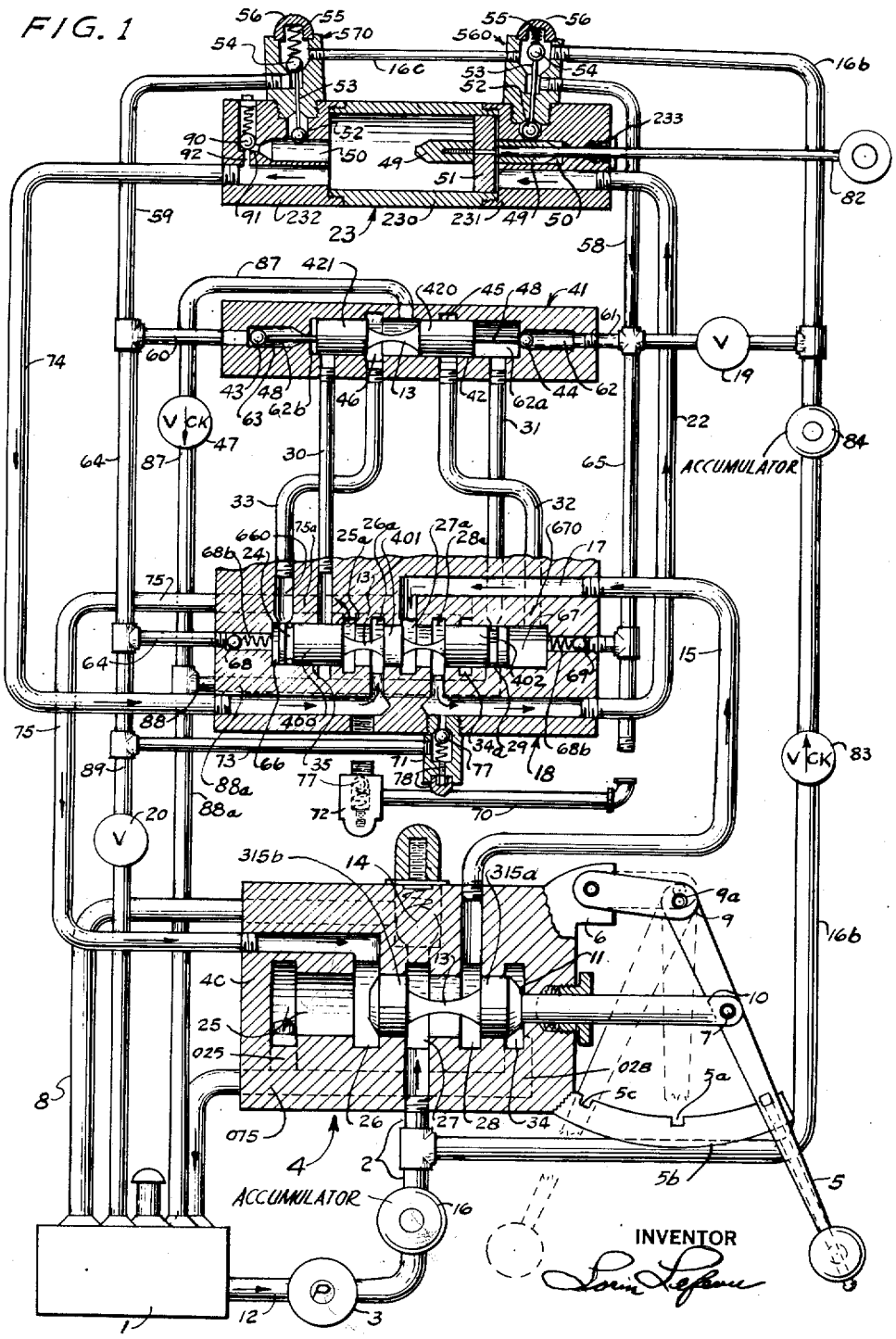
FIG. 1 is a schematic showing of the engine of the present invention, with parts broken away and in sections.

Referring in detail to the drawings, FIG. 1, the numeral 1 designates a supply tank, and the supply tank may hold a suitable quantity of oil or other fluid. A pressure pump 3 may be actuated by any suitable power source, and the pressure pump 3 is connected to the tank 1 by a channel or conduit 12. A main channel or conduit 2 leads from the pump to the control valve 4 and a return line 8 leads from the control valve 4 back to the supply tank 1. A main supply line 15 leads from the control valve 4 while a supplemental line 16b branches from conduit 2.

The details of the control valve 4 are shown in cross section on FIG. 1 being arranged with a spool 11 which is mounted within a longitudinal bore provided therefor, and it will be seen that control valve 4 includes a housing or casing 4c which has ears 6 extending therefrom or formed integral therewith. An actuating rod 10 arranged in permanent engagement with spool 11 extends slidably into housing 4c and a handle 5 is pivotably connected to the ear 6 with links 9 and by pins 9a, there being a pin 7 pivotably connected to the handle 5 and to rod 10 so that when handle 5 is manually actuated rod 10, thus spool 11 will be shifted. Handle 5 is provided with means for locking its movement by the action of a dog 5a in a rack 5b selectively and at will. Although rod 10 of FIG. 1 is shown as an integral extending part of spool 11, yet said rod 10 may, if desired, be arranged in flexible engagement with spool 11 as is elsewhere described in this application, thus to compensate for any misalignment between the travel of spool 11 and that of rod 10 in their respective bores or guides. The spool 11 is provided with a plurality of spaced heads 315a and 315b, FIG. 1, said heads being spaced apart by a stem 13, said stem being of smaller diameter than said heads to provide for fluid movement between said stem and the bore in which spool 11 moves. Said stems may be of any required length. Heads 315a and 315b may also be flexibly attached if desired to stem 13 as will be shown elsewhere in this application, or may be made integral with the stem 13. There is provided a longitudinal bore in the casing 4c which is arranged for spool 11, said bore being provided with a plurality of annular passages or recesses 26, 27, and 28, also 25 and 34. Said recesses 25 and 34 through communicating channels 025 and 028 merge with a common channel 075 to communicate via channel 75b with exhaust. Thus, when pressure exists in channel 2, annular recesses 26, 27, and 28 will insure equalized pressure being applied to outer spool surfaces by the circumfluence through said annular recesses of pressurized fluid upon the periphery of the spool, resulting in spool 11 being balanced by said surrounding fluid pressure thus not being forced against any side of the bore in which said spool moves. It will be seen that the construction seen on FIG. 1 permits the movable handle 5 to be manually moved whereby the spool 11 can be shifted so that it will be in the position shown on FIG. 1. Thus, as is presently shown, fluid from the pump 3 will pass from line 2, thence through a communicating passage in 4c to recess 27, thence along the longitudinal bore of housing 4c to the recess 28, thence communicating through an extending channel with conduit 15, thence to enter valve 18 at channel 17. Said fluid will then pass through valve 18 via recess 27a thence to recess 28a thence escaping, following arrows, into conduit 22, thus progressively through conduit 22 to enter power cylinder 230 through cylinder head 231, following the arrows, thus encountering and driving piston 51 of power cylinder 230 leftwise.

Arrows also denote the present flow of fluid being exhausted from power cylinder 230, FIG. 1. Thus it will be seen that oil is exhausted through a communicating channel of cylinder head 232 into conduit 74, thence progressively through valve 18. Thus fluid via the communicating channel from conduit 74 flows to recess 26a of valve 18, thence following the valve bore to recess 25a, thence into channel 75a, thence communicating with conduit 75. It will be noted that channel 75a is a channel common to both recess 25a and recess 34a. It can be seen, following arrows, that with valves in the position presently shown on FIG. 1, fluid following an extended channel from conduit 75 will reach recess 26 of control valve 4, thence following the valve bore to recess 25 will exhaust via channel 025 and channel 075 into channel 75b.

Now assuming that the handle 5 of valve 4 is shifted to the central dotted line position shown on FIG. 1 leftwise from its present line position, that in the new position fluid pressure from channel 2 will pass into valve 4 to recess 27, thence longitudinally to recess 26 thus emerging from valve 4 and via recess 26 through a communicating passage into conduit 75, which, in the first instance, was the main return or exhaust line. Thus power may be applied to piston 51 of power cylinder 230 reversely to that first described. It will be seen that spool head 315a of valve 4 would now be positioned to the left of recess 28, thus conduit 15, in this instance, is provided with an unobstructed channel for the reverse passage of fluid via recess 28 thence to recess 34 thence to conduit 75b via channel 028 and channel 075 and thus returning to tank 1. Thus is provided an exhaust from power cylinder 230 in reverse to that first described.

Finally, assuming that the handle 5 of valve 4 has been moved to its maximum left hand position, as shown by further dotted lines on FIG. 1, the following action takes place. Valve head 315b will now be at the extreme left of the bore in casing 4c while head 315a will have passed to the left of annular space 27. Thus fluid entering recess 27 through conduit 2 will communicate without restraint longitudinally through the open bore from recess 27 thence to recess 34, thence via channel 34 to dotted line channel 075 to communicate via conduit 75b and return directly to tank 1 so that the engine does not operate.

Valve 4 is further provided with an adjustable spring pressed ball member 14 constituting a relief valve to insure protection from an overloaded condition, thus under such conditions will release pressure entering through conduit 2 thus past ball member 14 into channel 8 to be returned to the supply tank. Accumulators 16 and 84, FIG. 1, may be arranged in the supply line 2 and 16b (16 being a supplemental line) in order to maintain a balance of pressure in the system so that smoother action will be insured, but the accumulators 16 and 84 may be eliminated if desired.

Although the drawings show the engine utilizing tubes or pipes, it is to be understood that preferably internal drilled channels are provided rather than tubing, so that the various valves such as 18 and 41 and their interconnecting channels may be provided in a single unit.

In this machine it is to be understood that there are two separate distinct and complete circuits of fluid under pressure and represented by conduit 2 also supplemental conduit 16b, thus each circulating simultaneously and without mingling, each circuit with its several valves being dependent on or affecting the other circuits. Thus, each valve excepting the control valve 4, namely valves 18 and 41, FIG. 1, being dependent upon the action of other valves viz. cylinder head valves 560 or 570 thereby to achieve an entity. Thus valve 560 will be actuated when moving taper 49 is at the right of cylinder 230, while valve 570 will likewise be actuated when taper 49 is at its leftwise movement.

The separate circuits, main circuit 2 and supplemental circuit 16b and the fluid passages therethrough are designated by arrows and may be followed also by numerical designation.

Tracing the circuits and their accomplishments, FIG. 1: Fluid flowing from the pump via conduit 2 arranged with an accumulator 16 thus divides into conduits 2 and 16b. After having proceeded through valve 4 as has been described, thus progressively through conduit 15, as has been described, fluid reaches channel 17, thence fluid in 17 of valve 18 progresses into annular space 27a thence following the valve bore of valve 18 to annular recess 28a, thus finding conduit 22, thence to cylinder head 231 thus following arrows encounters the face of piston 51, thus forcing said piston to the left until taper 49 engages and lifts ball 52, stem 53, and ball 54 of valve 570 thus providing communication, via an open continuing channel thus provided, between conduit 16c and conduit 59. Thus, fluid pressure flows progressively by ball 54 from conduit 16c responsive to pressure in 16b, thence to conduit 59, thereby allowing pressure to develop through channel 60 into space 63, thus to move valve spool 42 rightwise as will be fully described, thus valve spool 42 of valve 41 being rightwise, said spool 35 of valve 18, FIG. 1, in response to continuing pressure in channel 64, is free to move rightwise, as will later be described. Thus it will be noted that power originally was developing from channel 17 through valve 18 thence through channel 22 and cylinder head 231, thus to move piston 51 to the left thus imparting a leftwise power thrust to rod 82. It will be noted, see FIG. 1, that when the spool 35 of valve 18, in response to actuation by valve 570 moved rightwise as has been described, that the central head 401 of spool 35 valve 18 will be to the right of annular recess 27a thus opening annular recess 27a from channel 17, thence along the valve bore to recess 26a thus to conduit 74 via the extending communicating channel shown in engagement therewith. Thus pressure now encounters the left face of piston 51 through cylinder head 232 to thereby return piston 51 to the position shown on FIG. 1. It will be noted that when spool 35 of valve 18 moves rightwise that annular recess 34a will thus be opened along the valve bore to annular recess 28a, thus annular recess 28a and 34a will present an open passage from channel 22 to channel 75 via the dotted line passage 75a. Said channel 75 as shown in FIG. 1 discharges after having traversed valve 4, as already described, thus reaching the supply tank 1 through conduit 75b. Thus, channel 22 presents through valve 18 and valve 4 an open exhaust to the supply tank for the exhaust of fluid from cylinder 230, thus through cylinder head valve 231 as piston 51 moves to the right. It can be seen on FIG. 1 that when piston taper 49 engages and lifts ball 52, thus ball 54 through the medium of stem 53 of valve 560, thus opening channel 58 to pressure in 16b, that valve spools 35 and 42 will again assume the position shown on FIG. 1, as will be further described. Thus flow is reversed and will now be inward through cylinder 231, thus again forcing piston 51 to the left during which time exhaust takes place outwardly through cylinder head 232 as elsewhere described, thus to begin another cycle and this action will continue alternately while pressure is delivered from the pump 3.

It will be seen that valve spools 35 and 42 are arranged in close tolerance with their bores, thus to prevent leak along said bores to adjacent spaces or ports in said bores.

As has been said, actuation of balls from their seats in cylinder head valves 560 and 570 begin a sequence of valve action by first causing spool 42 of valve 41 to move rightwise or leftwise, as the case may be. Said movement of spool 42, valve 41, FIG. 1, does not constitute a finished action to reverse the power load. Valve 41, FIG. 1, serves as an exhauster valve for spaces 66 and 67 of valve 18.

Assuming that pressure exists in channel 60 and 64 from actuation of ball 54 of valve 570, thus it will be seen that spool 42 of valve 41, also spool 35 of valve 18, is each being urged rightwise by said pressure.

Attention is now directed to the numerals 69 and 68 of valve 18, FIG. 1, and it will be seen that said numerals at opposite ends of valve 18 each represents a spring pressed ball member upon a seat therefor.

It has been shown that valve spools 42 and 35 are each being urged right-wise immediately previous to the last description, thus there is hydraulic pressure upon ball 68 seeking to enter space 66 to thus move valve spool 35 rightwise. It can be seen that inflow valves 69 and 68 only allow inflow into spaces 66 and 67, thus being urged upon their seats by their springs in such a way that said spaces 66 and 67 may receive fluid from conduits 64 and 65 but that reverse flow from spaces 66 and 67 into conduits 64 or 65 thus is denied. It can be seen that there is provided a channel 670 communicating from space 67 at the right end of the longitudinal bore of valve 18, thus progressively through conduit 32, thence to annular recess 45 of valve 41. It can be seen that valve 41 is arranged with a plurality of annular recesses 45 and 46 in the bore thereof. It can be seen that with spool 42 of valve 41 in its present position that there is no communicating passage for fluid from recess 45 to be discharged from valve 41 because of the position of spool 42. Thus, the rightwise head 420 of spool 42 denies passage of fluid from recess 45 while at the same time check valve 69 denies passage of fluid from space 67.

It can be seen that there is provided a communicating passage from valve 41, thus through conduit 31 into an extending channel 88a in engagement therewith, shown by dotted lines, thus progressively following annular groove 29 around spool 35 of valve 18 to further communicate with channel 88 to thus continue into tank 1. It will be seen that with spools 42 and 35 in their present position that the last described channel thus presents a continuing open channel from space 62*a*, thus via conduit 31 to the supply tank 1. Thus no restriction to the rightwise movement of spool 42 presently exists. Thus, in consequence of pressure existing in conduit 59, spool 42 moves rightwise prior to the movement of spool 35 of valve 18. It will be seen that when spool 42 has moved rightwise that annular groove 46 of valve 41 will be sealed from fluid movement between conduit 33 and conduit 87 by the head 421 of said spool. Thus spool head 420 having moved rightwise of recess 45, will open a communication from conduit 32, thence through the bore of valve 41 to communicate with conduit 87 therefrom, thus into exhaust. Thus it will be seen that valve 18, as well as valve 41, is dependent upon employing valve 560 or valve 570, as the case may be, or valves having similar functions and later to be described, in combination with the functions of valve 41 and 18 as well.

The numeral 19 represents a manual shutoff valve leading from the supplemental circuit 16*b* and communicating through a suitable channel with flow reversing valves 18 and 41, FIG. 1. A similar valve 20 is interposed in the line 89 which connects the supply tank with the respective ends of lines 60 and 64 coming from valves [19] *18* and 41, said valve 20 to provide means of releasing pressure from the shifter spaces 63 and 66 at the left end of said valve spools. Thus, the valves [18] *19* and 20 are used to properly position the valve spools 35 and 42 of valves 18 and 41 respectively, initially after assembly of the apparatus, or in the event that spools 35 and 42, FIG. 1, are not in proper position to begin operation. Valves [18] *19* and 20 remain closed during operation of the engine. In order to properly position valve spools 35 and 42 when pressure exists in 16b the valve 20 is opened, next the valve 19 is opened, thus valve spools 35 and 42 will now instantly become properly positioned. Both valves 19 and 20 are now closed. The machine will now begin to operate as soon as pressure flows into valve 18 at passage 17.

The flow reversing combination valves 18 and 41, FIG. 1, are completely automatic, thus actuation being brought about by fluid flowing alternately into spaces 66 and 67 of valve 18 and into spaces 63 and 62 of valve 41 responsive to the actuation of ball valves 560 or 570. The parts 52 and including 56 constitute a first cylinder head valve 560, FIG. 1, and it will be seen that there is provided a second similar cylinder head valve 570 which has the same construction as the previously described valve 560, so that a description of one will suffice for both. Returning to the description of the operation of the automatic flow reversing valve combination, 18 and 41, FIG. 1, described with all the valves being in their present position the following condition obtains. It will be seen that ball 54 of valve 560 has been elevated from its seat by valve stem 53 responsive to the action of taper 49 against ball 52, thus presenting an open continuing channel for fluid pressure from supplemental line 16*b* through valve 560, thus into channel 58, said action at the present instance just having taken place. Thus fluid pressure, as denoted by arrows, has progressed from channel 58 thus into space 62 of valve 41 causing spool 42 of valve 41 to move to its present position. Exhaust from space 62*b*, while spool 42 is moving leftwise, takes place through conduit 30 via annular groove 24 of spool 35, valve 18, FIG. 1. It will be seen that while said spool 35 of valve 18 is rightwise that a communicating passage between conduit 30 and dotted line passage 88*a* will be provided, thus following annular groove 24 around spool 35 to complete the communication between conduit 30 and conduit 88*a*.

It will now be noted that spool 42 of valve 41 is provided with a valve spool shifter extension 48 at each end thereof and that said extension 48 will move into and out of spaces 62 and 63 during the time that spool 42 is moving, thus to actuate balls 43 and 44. Said balls 43 and 44 being provided with seats, thus when ball 44 is engaged with its seat, as presently shown, fluid can no longer flow from space 62 into space 62a, however at a time when either ball 43 or ball 44 is elevated from said balls seats by said valve spool shifter extension 48, fluid may flow via conduit 60 or 61, as the case may be, either into space 62b or into space 62a. Thus is constituted a device for [metering] *meting* the exact amount of fluid required to move valve spool 42 to the exact desired position and no further, thus [metering] *meting* the exact amount of fluid to accomplish this so that no fluid is lost.

It will be seen that movement of spool 35, valve 18, cannot occur before the action just described, the movement of spool 42, takes place. Thus, assuming that spool 35 and 42 are each in a rightwise position, valve 68 being closed by pressure from spring 68b, conduit 60 will now be open to exhaust. It will now be seen that conduit 32 is sealed by the position of spool head 402 and that conduit 33 is sealed from fluid movement from space 66 of valve 18 by head 421 of spool 42, thus there is no passage for the escape of fluid from space 66 through valve 41, thus spool 35 of valve 18 cannot move leftward from pressure in conduits 58 and 65 until spool 42 of valve 41 has first moved to its ultimate leftwise position thus to provide an open communication from conduit 33 to conduit 87 via said valve 41 bore. It will be seen that the same condition will obtain involving conduits 59, 64, 32, 33, and ball 69 when spools 42 and 35 are moving rightwise.

Figure 2:
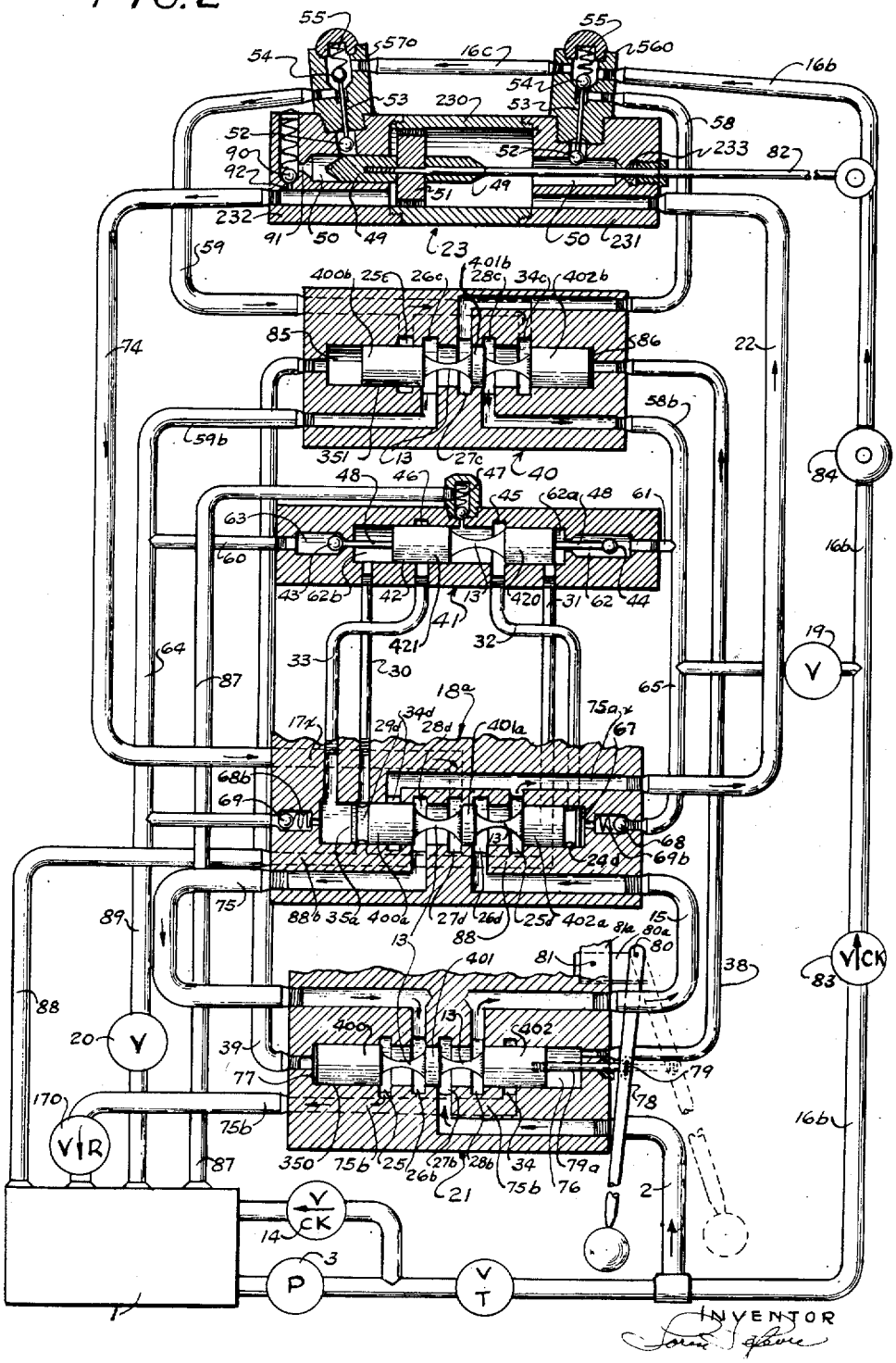
FIG. 2 is a schematic showing of the engine of the present invention having the additional feature of being selectively reversible at will.

A comparison of the position of spool 42 and spool 35 shown on FIG. 2 as against that shown on FIG. 1, will confirm the above explanation. Thus, because of the further fact that conduit 30 is aligned, by the rightwise position of spool 35, valve 18, FIG. 1, with an annular groove 24 formed upon said spool 35 for the passage of fluid through said groove 24, thus to one open passage 88a, thence to conduit 88 leading to the supply tank, there is now no hindrance to fluid passing out of space 62b thus conduit 30. Thus, because of pressure existing in conduit 61 from open ball valve 560, valve spool 42 will move leftward to the position shown in FIG. 1 thus providing an open channel communicating from space 66 through conduit 33 and via valve 41 bore, thence to 87 emerging from valve 41 thus to continue through conduit 87 into supply tank 1. Thus, valve spool 35 of valve 18 now no longer being restricted moves leftward to the position shown on FIG. 1. Spool 42 of valve 41 and spool 35 of valve 18 will thus be returned rightwise in a similar manner upon piston 51 reaching its ultimate travel leftward at which point valve ball 54 of valve 570, responsive to the action of taper 49, will thus be elevated from its seat.

Ball 54 of valve 570 being thus elevated will allow pressure to develop in channel 60. It being noted at this point that ball 54 of valve 560 will have been seated, therefore pressure will have ceased to exist in space 62, FIG. 1, thus conduit 31, FIG. 1, being open through annular groove 29 of valve spool 35 to tank return channel 88, pressure developing in space 63 at this point will initially move valve spool 42 rightwise. Thus is provided an open channel 32, upon spool 42 reaching its ultimate rightwise movement, for the escape of fluid from space 67 of valve 18 through channel 32 thence via the bore of valve 41 thus emerging therefrom into tank return channel 87 to exhaust. Thus valve spool 35 of valve 18, FIG. 1, is now permitted to move to a rightwise position. Valve spool 35 exhaust through conduit 87 may be provided, if desired, with a spring pressed escape valve 47 designed to allow fluid to flow only toward the supply tank 1. Thus it will be understood that the reversing valve combination necessarily comprises ball valves 560 and 570 (or valves having similar properties such as 71 or 72, FIG. 1), in combination with valves 18 and 41, and that in combination are necessary for the successful operation of the entire structure.

Exhauster valve 41 is provided with a casing having a longitudinal bore in which a spool 42 is slidably mounted. Valve spool 42 is provided with a plurality of heads 420 and 421 which are spaced by a stem 13 of a length to insure that certain sets of ports will be matched when spool 42 is in one position and with a different set of ports when in a moved position. It will be seen that the inner wall of said valve 41 is provided with a longitudinal bore and is arranged with a plurality of spaced annular passages, thereby through pressure in said annular passages providing that pressure will encounter the outer spool surfaces equally from all sides simultaneously at all times. Thus said spool actually floats in oil, therefore, is not forced against the bore or cylinder wall at any time, thus said spool is held in balanced relation to the wall of the bore by equalized pressure to minimize friction, thus to provide effortless shifting, thereby assuring long life. The valve 41 is provided with a plurality of spaced ports communicating with said valves interior bore, said ports being correctly spaced to communicate with conduits designated by the numerals 30, 31, 32, 33, and a port communicating with conduit 87. Valve 41 is further provided with ports that communicate with channel 60 and 61. Conduit 32 communicates with an annular recess 45, while conduit 33 communicates with a similar annular recess 46. Valve balls 43 and 44 move into and out of engagement with seats in cylindrical spaces 62 and 63 responsive to the movement of spool extension stems 48, as has been described. Said spool extension stems may be provided integral with valve spool 42 or may be otherwise attached. It is to be understood that spool exhaust ports in valve 41 and communicating with conduits 30 and 31 are spaced away from each respective end of the bore in which spool 42 moves, thus to provide for the entrapment of fluid beyond said exhaust ports, thus causing exhaust from space 62 and 63 to cease before the spool can strike the end of space 62a or 62b, thus a spool or piston may be stopped against entrapped oil rather than allowing it to encounter the solid end of its bore. This feature may be utilized in various devices such as pistons, spools, etc., as will be later shown. A leak through a restricted passage provided within the spool or piston may be so arranged as to allow the entrapped fluid to recede from the entrapment slowly thus providing deceleration of a piston, spool, etc., without shock thus assuring comparatively silent operation as will be later described.

The valve balls 43 and 44, provided in valve 41, moving into and out of engagement with their seats provide a positive means for [metering] *meting* the exact amount of fluid required to move spool 42 to an exact position. Thus, as an example, when fluid enters space 62a, FIG. 1, forcing valve spool 42 leftwise, ball 44 being only moderately smaller than the bore in which it moves will follow the valve spool 42, thus riding upon the end of the spool extension 48 until the ball 44 encounters its seat thus sealing away any further flow of fluid into valve bore 62a. Thus said spool 42 overrunning either exhaust port 30 or 31, as the case may be, is stopped against its oil cushion in space 62a or 62b or is stopped by vacuum within either space 62a or 62b. Thus is provided a means, the valve ball 43 or 44 having no physical bond with the spool 42, whereby the weight and momentum of the spool does not in any way encounter the valves seat, thus the weight of the ball 44 being trivial does no damage to its seat. Immediately upon said spool reversing its movement a respective advancing lifter stem 48 encounters the ball 44 (assuming that spool 42 is moving rightwise) thus elevating said ball 44, consequently opening space 62a, FIG. 1, in order that *at* a correct time fluid may again flow into space 62a thus to cause spool 42 to again move to the left. Leftwise stem 48 with ball 43 and the seat therefor constituting a duplicate valve which accomplishes similar functions to those just described during the time that flow is inward at conduit 60.

In describing flow reversal valve 18, FIG. 1, said valve 18 is provided with a longitudinal bore arranged with spaced inner annular recesses designated by the numerals 25a, 26a, 27a, 28a, and 34a. Said grooves 25a, 26a, 27a, 28a, and 34a completely surround a spool which is slidably arranged in said bore in such a way that said spool 35 is surrounded on its circumference by oil under pressure. Thus said spool 35 floats in oil and is not forced against any side of its bore assuring that wear will be practically non existent, thus assuring that the said spools shifting will be accomplished easily and effortlessly, thus practically no power will be required for reversing the pressure flow. It is to be understood that head spacing member or stem 13 may be made as long as required for proper spacing of spool heads, and that stem 13 is of less diameter than said heads to provide for circulation between said heads and along said stem 13.

Valve spool 35 may be provided with a required number of heads different to that shown on FIG. 1.

Spool 35 of flow reversal valve 18, FIG. 1, is shown to have three heads which are designated by the numerals 400, 401, and 402. Heads 400 and 402 are shown of greater length than head 401, and are arranged with spaced annular grooves 24 and 29. Said grooves 24 and 29 alternately match ports communicating with conduits 30 and 31 responsive to spool 35 being either rightwise or leftwise in the bore serving said spool. Thus, when spool 35 stops at its correct position of movement, is matched conduit 30 through groove 24 with a port positioned to communicate with conduit 88, thus providing a continuous passage communicating from conduit 30 thence through groove 34 thence to a port communicating with conduit 88 and thence to tank 1. When spool 35 is at the opposite end of valve 18 conduit 31 is matched with the communicating port of conduit 88 through groove 29. Thus in each case is provided an open channel from space 62a or 62b for the exhaust of fluid therein thereby allowing spool 42 of valve 41 to shift. Valve 18, FIG. 1, is provided with ports 660 and 670 communicating with spaces 66 and 67, said ports being spaced away from each end of the longitudinal bore in which spool 35 moves (said ports to communicate with conduits 32 and 33 via valve 41 into exhaust) to thus provide an oil cushion for stopping the movement of spool 35 in the same manner as that previously describing spool 42 of valve 41. Valve spool 35 of valve 18 may also, if desired, be provided with shifter extensions 48 on its spool and with ball valves similar to those of valve 41 already described. Valve 18, FIG. 1, is provided with ports communicating with conduits 15, 32, 30, 31, 22, 33, 64, 65, 70, 73, 74, 75, 87, 88, 88a, and 89. It can be seen that spring loaded relief valves 68 and 69 are positioned in ports leading to spaces 66 and 67 of valve 18 and these valves are arranged so that fluid flow may be only inward into space 66 or 67 of valve 18 from conduits 64 and 65, as has already been described. Valves 560 and 570 are located at a point upon a respective cylinder head at which it is desired that normal reversal of the movement of the piston is to take place, and their operation and accomplishments will have been fully described so that no further description of them is deemed necessary.

The numerals 71 and 72, FIG. 1, designated spring pressed release valves responsive to hydraulic pressure which may be placed to communicate from the pressure conduits 22 and 74 thence to conduits 64 and 65 through channels 70 and 73.

It will be noted on the drawing, FIG. 1, that said valve 72 is shown exploded downward from valve 18 in order to bring it into view. The action and construction of these valves 71 and 72 being identical except that they serve opposite ends of valves 18 and 41, it will therefore be deemed sufficient that a description of valve 71 will suffice as a description of each. Thus valve 71, being mounted to communicate from channel 22 and with channel 64, is an adjustable spring pressed release valve responsive to hydraulic pressure and comprising a ball and spring assembly 77 with a seat and an adjusting screw 78 resting upon a spring member which urges the said ball into closing relationship with its seat. Said adjusting screw being so placed that it may be adjusted through the means of the spring to release fluid pressure from channel 22 into channel 64 at a desired pressure. Thus, when pressure in 22 exceeds that for which the valve 71 is set, pressure entering channel 64 from channel 73 will actuate the flow reversing valves 41 and 18 in the same manner as would have the valve 570 had said valve been actuated by the taper 49 to reverse the movement of piston 51. Thus it is possible under a predetermined load to cause the piston to return from any point in its travel without the necessity for the pistons taper to reach the ball valve 570 if said pistons motion is progressively in that direction. It is thus possible by arranging to build up a sufficient load wherever desired within the possible ultimate reach of the piston to thereby have the piston automatically returned from that point. Thus, if no overload exists on the opposite side, said piston 51 will then continue progressively in that direction until its taper 59 actuates the ball 52 of valve 560 or 570, as the case may be, thus beginning another surge of power in the direction it was moving when first reversed by the overload. Thus, fractional thrusts of the piston may be had when the engine is under load in either direction, or a full thrust on one side while at the same time providing a fractional thrust in the opposite direction. The immediate previous description has been directed to valve 71, FIG. 1. Valve 72, being a counterpart, merely serves the opposite side of the apparatus in a similar manner.

Although space 50 in each cylinder head is provided with a mono-flow valve 90, 91, and 92, said valve is not represented on the right cylinder head 231 of FIG. 1 because of crowding, yet may be assumed to have been placed within the cross section not shown.

The numeral 82 designates a piston rod adapted to be connected to a load. Although the drawing FIG. 1 shows such a rod 82 arranged on the right side of the servo motor, said servo motor may be provided with a similar power outlet rod 82 at either end of said servo motor or at both ends thereof. The said piston rod 82 emerges from piston head 231 through a suitable packing gland 233.

Returning to the monoflow valve designated by the numerals 90, 91, and 92, it will be seen that the entry port 90 of said monoflow valve is positioned within space 50 wherein fluid entrapment occurs. Thus fluid flowing into space 50 from communicating channel 92, when pressure exists in conduit 74 (assuming that member 49 has entered space 50 in cylinder head 232), will thus urge the piston extension 49 away from socket 50, thus to eliminate a possible vacuum therein when piston 51 is returned toward the opposite end of cylinder 230.

It has been seen on FIG. 1 that through the means of placing the handle 5 of control valve 4 in its central dotted line position, power flow from valve 4 will be transposed, thus will flow reversely to that shown with handle 5 in its present position. Thus, with handle 5 in the central dotted line position, will be provided reverse motion to the piston 51 for one-half of a cycle. It will be seen that in order to provide full continuing reciprocating motion reversely to that shown on FIG. 1, that the valve control circuit 16b entering shifter spaces 62 and 63 of valve 41 from cylinder head valve 560 or 570, as the case may be, must also be reversed or transposed as well as must the power circuit be.

FIG. 2 illustrates a modification of the engine arranged to produce continuing fully reversible reciprocative power output rather than being reversible for only one-half of a cycle, as is represented in FIG. 1. A study of FIG. 2 will disclose that in order to produce fully reciprocative motion to piston 51 that a simultaneous reversal of fluid flow must occur in channel 21 and 74 as well as in channels 58b and 59b, thus flow must be transposed in each of said channels at the same time, while at the identical time pressure in channel 2 and in channel 16b remain constant. (The words channel and conduit, in a sense pertaining to each other, are being used interchangeably.) Study of FIG. 2 will disclose that the flow in conduit 59 has a choice, selectable by the operator of following conduit 59 to either conduit 58b or to conduit 59b, also, flow from conduit 58 has a similar choice of reaching either conduit 58b or conduit 59b. This last named choice is determined by valve 40 at the will of the operator. Thus it will be understood that when flow in power channel 2 and flow in channel 16b are so arranged, i.e., so as to be transposed simultaneously, other structural changes are not required.

Valve 18a, FIG. 2, shown in cross section, is a duplicate of valve 18 FIG. 1, however, 18a is shown in a potion 180 degrees longitudinally revolved, thus parts, numbers, etc., appear inversely to their position shown on valve 18, FIG. 1, as evidenced by channels 17 and 75a now being designated as 17x, 75ax on FIG. 2. Thus channel 75ax is shown in communication with conduit 22, while channel 17x communicates with conduit 74.

Attention is directed to grooves and annular recesses in valve 18a, FIG. 2, these being duplicates of grooves and annular recesses 24, 25a, 26a, 27a, 28a, 34a, and 29, shown on FIG. 1, however, in valve 18a of FIG. 2 these are designated 24d, 25d, 26d, 27d, 28d, 34d, and 29d, and channel 88b is also shown. The spool of valve 18a is designated as 35a, while the spool heads, being duplicates of those shown in other figures, carry the designation 400a, 401a and 402a. The valve spool of valve 40 is designated 351. Spool heads of valve 40 are designated by the numeral 400b, 401b, and 402b, while the annular recesses of said spools bore are designated 25c, 26c, 27c, 28c, and 34c. Valve 41, FIG. 2, is identical to that previously described in discussing FIG. 1 both in structure and in function, and carries identical designations. Valve 40 and valve 21 are similar in construction to that of valve 18, FIG. 1, insofar as annular recesses, spool heads, and feed and exhaust channels are concerned. Control valve 21, FIG. 2, and pilot valve 40, FIG. 2 do not have ports or channels 30, 31, 32, and 33. Inflow valves 68 and 69, also channels 88b, are not provided in valves 40 or 21. It is believed that no further description of the construction of the said several valves need be made. It will be seen that when spool 42 of valve 41 moves leftwise that space 62 will be exhausted through conduit 30, thence through annular groove 29d of spool 53a in valve 18a, thence through 88b to exhaust, as has been previously described.

Control valve 21, FIG. 2, is provided with a modified type of spool 350 shown in threaded engagement with a control rod 79a. Said spool 350 carries out the same functions that are carried out by spool 11, FIG. 1, yet, in addition, said spool 350 is arranged to control the movement of spool 351 in valve 40 simultaneously. The control rod 79a is arranged to extend through a suitable packing gland, and is flexibly engaged by a pin 79 to handle 78. The handle 78 is flexibly engaged by pin 80 and link 80a, thus also pin 81 and ear 81a, said ear 81a being formed integral with the body of valve 21. Said spool 350 of valve 21 directs fluid flow from conduit 2 progressively through conduit 15 when spool 350 is leftwise via recess 27b, thus to 28b, and the arrows designate flow, thus also progressively from conduit 2 via 27b, thence to 26b and reversely to the arrows shown on channel 75 and channel 15, thus to conduit 75 when said spool is rightwise. An exhaust channel is provided from control valve 21.

Interest is now directed to the manner of directing a choice of fluid from channel 16b to either of the channels 59b or 58b via valve 40, or, again, from conduit 16b via channel 58 to either of the conduits 58b or 59b via said valve.

It can be seen with the parts in their present position, thus following the arrows, ball 54 of valve 570 being raised, that an open channel via conduit 16b thence to 16c, thence via valve 570 to conduit 59, thence via the communicating channel of valve 40 to recess 34c, thence via recess 28c to the channel communicating with conduit 58b, is provided.

It can be seen that when handle 78 is drawn rightwise to the position shown by the dotted line that fluid flow in channels 15 and 75 will be reversed from that presently shown on FIG. 2 as a consequence of spool head 401 then being moved rightwise of recess 27b, thus causing the flow to be from recess 27b thence to recess 26b, thus reversely through conduit 75, as has been set forth. Pressure, while handle 78 is moved rightwise, will develop in space 76, while at the same time vacuum will develop in space 77 responsive to the movement of spool 350. Thus, pressure developing in space 76 advances, following arrow, through conduit 38, thence via a port in valve 40 communicating with space 86 of valve 40, FIG. 2, while at the same time vacuum develops from space 77 via conduit 39 thence through a communicating port into space 85 of valve 40, thus inducing spool 351 to move leftwise in the bore of valve 40. Valve spools 350 and 351 will be returned to their present position shown in FIG. 2 when handle 78 is again returned to a leftwise position. It can be seen that valve 40 is a duplicate of valve 21 except that valve 40 has been revolved transversely 180 degrees from that shown on the drawing of valve 21, also, valve 40 does not have rod 79 or a shifting handle 78 shown in FIG. 2. It is to be understood that conduits 38 and 39 and the spaces [60 and 67] *85 and 86* are maintained at full capacity with oil at all times.

When spool 351 has moved leftwise responsive to the movement of handle 78, as previously described, it can be seen that fluid flow will still proceed via channel 16b to channel 59, as already described, but, in this instance, flow will now proceed from channel 59 via annular recess 25c thence to recess 26c thence via an extending channel shown to conduit 59b rather than to channel 58b, as is presently shown on FIG. 2, thus operating beyond pilot valve 40 reversely to that presesntly shown.

It will be understood, assuming all parts are in their present position, shown in FIG. 2, that when valve ball 54 of valve 560 is elevated by the action of taper 49, consequently valve ball 54 of valve 570 being seated, that the channel 58 will be similarly transposed, pertinent to FIG. 1, as is channel 59 via channel 16b to channel 59b when taper 49 is rightwise.

In the instance describing FIG. 1 channels 58 and 59 continued respectively directly to channels, thus from 59 to 60 and 58 to 61, as has already been fully described.

It has previously been shown in this application, pertinent to the flow reversal valve combination 18 and 41, that depending upon whether the spools of valves 18 and 41 stand rightwise or leftwise in their bores, this will determine the direction of fluid flow in channels 22 and 74. It is now apparent how the position of valve spools of valve 18a and valve 40, FIG. 2, responsive to the movement of handle 78 may be selectively determined at the will of the operator, at an identical time, by employing valve 21 and 40 to selectively direct fluid pressure into either conduit 58b or 59b from conduit 16b.

It will be seen on FIG. 2 that if fluid flow was not transposed from conduit 59 to conduit 58b, as is illustrated, and did, therefore, continue in conduit 59b that spools 350 and 351 would be locked in their present position by the pressure from conduit 16b. Thus full reciprocative power in reverse beyond one half a cycle, as is possible on FIG. 1, would be denied. Thus, by the movement on handle 78 rightwise or leftwise, is achieved instant reversal of full reciprocative power at any point and at any speed.

The feature of having a choice of direction in which power will flow makes possible the rotation in either direction of a rotated shaft through a crankshaft means.

In the application of rotative motion a crankshaft means is utilized and preferably a crankshaft having more than one crank throw spaced relatively off center from each other, so that the center points of each crank in its rotation is not reached simultaneously in order to obviate a dead center point of the separate cranks at an identical time, each crank being a continuation of a single crankshaft, as is the case with a steam locomotive or other similar engine having multiple cranks on a single throw.

The numeral 170, FIG. 2, represents an adjustable choke or resistor valve, by means of which the number of power impulses or piston strokes in a given space of time may be governed with exceeding accuracy. Thus, when valve 170 is set to release liquid at a time when impulses have reached a desired frequency, overload valve 14, shown in FIG. 1, being set to release at a slightly greater but closely corresponding pressure to that of valve 170, thus fluid flow in excess of that required to maintain the desired frequency of impulsese will be released by release valve 14 directly to the exhaust. Thus pressure may be so set between valve 14 and valve 170 to produce the desired number of reciprocations, yet also said reciprocations may be produced at a desired pressure. Thus may be controlled the power output as well as the number of reciprocations in a given time, both accurately and efficiently and at the same time.

It can be seen on FIG. 2 that each of said valves 21 and 40 employs a spool slidably arranged in a bore therefor and that said spools are arranged with a plurality of heads or lands, for matching certain passages with other passages in said bore when said spool is slidably moved from one place in said bore to another place therein.

The modification shown on FIG. 3 illustrates a modified valve combination relative to valves 18 and 41 of FIG. 1. Thus, spools 35c of valve 18b employs but two heads 400b and 402b. Other constructional features of valve 18b, i.e., ports, channels, recesses, etc., are similar to valve 18, FIG. 1, however, the numeral designations 24x, 25x, 26x, 27x, 28x, 29x, and 34x, are used.

It will be understood that the stem 13b separating the heads 400b and 402b of valve 18b, FIG. 3, may be made as long as may be required.

It will be seen that the spool 35c of valve 18b is arranged with shifter extension pistons 35a extending longitudinally from said heads 400b and 402b. Each of said shifter extension pistons is designated by the numeral 35a as each of said shifter extensions is a duplicate of its opposite, thus merely serving opposite ends of said spool 35c in a similar manner. Said shifter extension pistons 35a are of a smaller diameter than the said heads 400b and 402b. Said extension pistons 35a are provided with bores designated to receive slidably, in close tolerance thereto, the said extension pistons 35a. Said bores serving said extensions 35a are each a continuing bore following the longitudinal axis of the bore which serves spool 35c.

The shifter extension pistons 35a may be made integral with spool 35c or may be flexibly attached thereto, as will be later described, thus compensating for any misalignment between the movement of spool 35c in its bore and the bores which serve said extension 35a. Said extensions 35a moving in bores of a minimum diameter thus require a minimum of fluid flow for causing spool 35c to shift. The shifter extension pistons 35a, in the present case, carry out the functions already described and previously shown to be carried out by the extended spool heads 400 and 402, FIG. 1, which, in that illustration, were the shifting means. It will be seen that said shifter extensions 35a are arranged with annular grooves 24x and 29x in the same manner and for the same purpose as were other similar grooves, viz., 24 and 29, FIG. 1. Thus, it will be seen in the present instance that annular groove 24x, FIG. 3, provides communication between conduit 30 thus following a continuing channel and communicating with conduit 88 to exhaust fluid from space 62b of valve 41, in this manner allowing valve spool 42 of valve 41 to move leftwise.

In a similar way annular groove 29x provides communication between conduit 31 and conduit 88 when spool 42 is leftwise, thereby providing exhaust from space 62a while spool 42 is progressing rightwise.

It will be seen that when spool 35c of valve 18b, FIG. 3, is in said spools present position that the flow of pressurized fluid entering the structure from conduit 2 thus enters the space 27xv of control valve 4x, thence following the valve bore to recess 28xv, thence to conduit 15, thence to enter valve 18b, thus to space 27x thereof. Fluid will flow from recess 27x via the valve bore of valve 18b, thence to recess 28x, thence to conduit 22, thence to enter space 50 at the rightwise side of servo motor 23a, thus to force piston 51a leftwise, consequently causing exhaust from the rightwise side of servo motor 23a to flow progressively to valve 18b via conduit 74. A full discussion has already been had covering the progress of exhaust viz., the description of FIG. 1 which does not differ from that in FIG. 3, so that fluid flow will be already understood.

The leftwise end of servo motor 23a, FIG. 3, is a duplicate of the rightwise illustrated end so that duplicate action to that describing the rightwise action occurs at a time when pressure is progressively from 18b via conduit 74 to the servo motor 23a, while at that time exhaust is through conduit 22.

It will be seen on FIG. 3 that, at a time previous to that illustrated, in its movement rightwise piston 51a would overrun the main passage and port communicating with conduit 22, as is presently shown, thereby sealing said passage from further fluid movement.

It will be understood that during the time that piston 51a was moving rightwise conduit 32 was serving as the exhaust channel from servo motor 23a. Thus when piston 51a, in its rightwise movement, overran the main port communicating with conduit 22 that residual fluid would be entrapped within space 50.

It will now be seen that a monoflow valve, to be more fully described, comprising channels 91 and 92, and arranged with a ball member 90 which is urged into closing relationship upon a seat therefor in channel 91 is provided. Thus it will be seen that at the time piston 51 was at its ultimate position of movement rightwise that fluid has been entrapped in space 50 thus providing a stopping means for the movement of piston 51a.

It will be understood that, presently, FIG. 3, 51a is moving rightwise, and a full description has already been made elsewhere in this application to show how reciprocation motion is achieved from a piston.

It can be seen that FIG. 3 represents a fully reversible engine similar to that previously described in this application, viz., in FIG. 2. It will be noted on FIG. 3 that check valves 68 and 69 serving spaces 66 and 67 of valve 18b, are differently placed than said valves were placed on FIG. 1, but valves 68 and 69, FIG. 3, serve an identical purpose to that previously described.

It will be noted that the modified spool 351 of control valve 4x, FIG. 3, is provided with piston extensions 480 and 480r extending from each of the heads thereof. Said extensions 480 and 480r are arranged to move in longitudinal bores of a proper diameter, thus said extensions are arranged in close tolerance with said bores, thus to prevent leak along said bores.

It is to be understood from previous description that the said before mentioned bores are each a continuing extending bore along the longitudinal axis of the main bore of valve 4x, or valve 18b, as the case may be, or any similar valve having a similar function.

Said extension 480 or 480r are arranged to direct fluid inwardly or outwardly, as the case may be, when spool 351 is manually moved, thus from spaces 85 and 86 of valve 40a in the same manner as that already described in this application, viz., valve 21, FIG. 2.

In the earlier description of FIG. 2 it was seen that the extended spool heads 400a and 402a caused movement of fluid through conduits 38 and 39, however, spool 351 of valve 4x, FIG. 3, is a modification of said previously described valve. In this modification the extension 480 or 480r is arranged with a smaller diameter than the main spool 351 thereof, thus, extension 480 or 480r causes the movement of fluid through conduits 38 or 39 in this instance. Extension 480r shown at the rightwise end of spool 351 of control valve 4x, FIG. 3, is of a larger diameter than the said extensions counterpart 480 shown at the leftwise end of spool 351. Thus, the larger diameter of the extension 480r compensates for the area requirement of the extension pistons rod 76a which is connected to handle 5a [a] similar to handle 78 of FIG. 2, and provided to accomplish manual shifting of fluid circuits, as previously described in this application. Thus, said rightwise shifter extension 480r will move a similar quantity of fluid either into or out of conduit 38 as well as will its counterpart 480 move fluid into and out of conduit 39 when handle 5a of valve 4x, FIG. 3, is moved rightwise or leftwise.

It can be seen that spool 351a of valve 40a, FIG. 3, is a modified spool having a piston extension 480a extending from either end thereof, said extension being similar to extension 480 of valve 4x.

The recesses provided in valve 40a are duplicates of those in the bore of valve 4x, however they carry the designations 25e, 26e, 27e, 28e, and 34e.

The functions of said recesses have already been fully discussed.

It can be seen that, with spool 351a, in its present position, fluid flow will progress from conduit 58 to recess 27e, thence via the valve bore of valve 40a to recess 26e, thence to conduit 59b, thus to actuate valve 41 and valve 18b in the same manner to that which described valves 41 and 18a of FIG. 2, so that no further description is necessary.

It can be seen that when spool 351a is moved to a rightwise position fluid flow from conduit 58 will progress via recess 27a, thence to recess 28e, thence to continue through conduit 58b, thus to actuate spool 420 of valve 41, also spool 35c of valve 18b leftwise within said spools bore.

The valve action, responsive to pressure in conduit 33 or conduit 39, has been previously fully discussed.

FIG. 4 illustrates in partial cross section a method which may be utilized in arranging flexibly attached extension pistons 35a to a valve head, 400 or 402, also a method of attaching a stem thereto, said stem having been given the numeral designation 13 on the drawing. The power output piston rod of a piston may be so similarly flexibly attached to its piston. It will be understood that flexibly attached extensions of the kind described provide a means to compensate for misalignment of a bores axis with said piston extension, or with the heads of a spool, etc.

It will be seen on FIG. 4 that the numerals 48 designate, in dotted lines, piston extension stems which have already been described in this application and which actuate ball valves, as have already been described as a [metering] *meting* means for [metering] *meting* an exact quantity of fluid for a required purpose in a fluid power shifted valve.

The numerals 24, 29, 400, 13, and 402, are shown on FIG. 4 in their relative positions, and their functions have already been fully described.

It will be seen on FIG. 4 that stem 13 is provided with a flange for holding head 400 and head 402 securely in engagement therewith when assembled thereon. It will be seen that extension 35a is similarly arranged and that a cushioning means 415 may be provided between said flanges.

The numeral 416 represents a spring ring mounted within an annular groove, thus, members 402, 35a, and 13, are held securely assembled as a unit by spring ring 416 within the annular groove provided therefor. It will be understood that piston 35a, head 400, and stem 13, shown at the left of FIG. 4, are duplicates of the first described members 35a, 402, and stem 13 shown at the rightwise side of FIG. 4.

The members 48 have been shown in dotted lines because their use may be dispensed with in certain valves where [metering] *meting* means are not required.

The stem 13 of the spool shown on FIG. 4 may be made integral with heads 400 and 402 when flexibility is not required, thus, when not arranged in said integral manner, a bore is arranged at each end of said spool, thus within the spool head to accommodate extension piston 35a with its flange, and the spring ring 416, or other suitable means, may be utilized to maintain secure assembly of the parts when heads are flexibly attached to said extension piston 35a.

Spool heads 400 and 402 may be of a desired size, and members 35a may be of a lesser diameter, thus to minimize the quantity of fluid required for shifting to a lesser amount than would be required if the total spool head area represented the shifting means, as has been fully described elsewhere in this application.

FIG. 5 illustrates one end of a servo motor, and it will be understood that said servo motor is provided with a similar arrangement at its opposite end which operates in a similar manner to that describing the motor end shown on FIG. 5. Thus it is not deemed that an illustration of the opposite end of said servo motor is required, thus said opposite motor end is a duplicate of that shown on FIG. 5.

FIG. 5 shows the rightwise end of a servo motor comprising a cylinder 230a with its cylinder head 231a, together with a cylinder head valve 560 mounted thereon and shown in cross section, with a piston 51c, shown in partial cross section and arranged with a power outlet rod 82.

The numeral 231a represents a cylinder head, said head being so arranged as to provide an encircling passage way for jacketed section 428 surrounding said cylinder 230a. Said jacket may extend over the outer surface of said cylinder in such a way that the internal pressure within said cylinder will be balanced by the external pressure thereupon so that a cylinder of great strength is not required.

Said cylinder 230a is arranged with a plurality of radially extending ports 99 to provide communication *from* said jacket 428 and the interior of said cylinder 230a, thus through said cylinder ports 99.

It will be seen that the said encircling jacket 428, FIG. 5, is sealed from the escape of fluid at either end of said jacket by pressure sealing rings 93, of a compressible nature, said rings being in engagement with said jacket and said cylinder wall 230a, there being such a ring 93 toward each end of said jacket. Said jacket may extend a desired length along said cylinder 230a.

A piston 51c, FIG. 5, is provided and said piston is arranged in cylinder 230a and having sealing means within said cylinder such as a piston ring, not shown, or with cuplike sealing members 96 such as are well known in pumps, etc., or other desirable means to prevent leak from the pressure side of said piston, thus between said piston and the cylinder wall. An annular groove 95 is provided on the circumference of said piston 51c and an open restricted passageway 97 communicating with said annular groove 95 and the nearest face of piston 51c is arranged so as to provide communication from cylinder space 50 and said groove 95.

There is also arranged between the main intake passage from conduit 22, and further identified by the numeral 92, an open passageway communicating with a second passageway 91 during the time that ball valve 90 is raised from its seat by hydraulic pressure, thus constituting a monoflow or check valve. It will be seen that ball 90 is normally urged into closing relationship with the seat provided therefor by a spring 90b. It will be seen that channel 91 continues via a port 171 into the interior area of cylinder 230a. The numerals 92, 91, 90, and the spring 90b therefore constitutes the monoflow valve previously referred to above, thus to allow fluid flow progressively into space 50 yet preventing outflow therefrom.

It will be understood that, assuming that conduit 22 is serving as the exhaust means and that piston 51 is moving rightwise, that as piston 51c overruns ports 99 that fluid movement from cylinder 230a via conduit 22 is no longer possible. Thus, it will be seen that space 50 constitutes an area for the entrapment of fluid as a consequence of ball 90 of the above described monoflow valve being urged into a closed position with its seat, thus, as has been shown, is provided a stopping means to prevent piston 51c from striking the cylinder head.

It can thus be seen that when a reversal of pressure flow effected by the action of the flow reversing mechanism already described elsewhere in this application, that pressure will develop within conduit 22, thus within jacket 428, but it will be seen that piston 51c blocks entry of fluid to cylinder 230a during the time that piston 51c is rightwise as on FIG. 5. It will be seen that pressure within the communicating passage between conduit 22 and the said jacket may also communicate with passage 92 to thus urge ball 90 from said balls seat in such a way that fluid pressure will flow from conduit 22 via passage 92, 91, and 171 thus into space 50. It will thus be seen when ball 90 has been actuated from its seat that an open channel for the entry of pressure into space 50 is provided, thus allowing pressure to bypass the normal main inlet channel and to enter space 50 to initially move piston 51c leftwise, thereby opening the main inlet passage to unobstructed fluid inflow.

It will be seen that a communicating passage for fluid from space 50 via channel 97 to annular groove 95, thus to port 99, remains open after piston 57c, when moving rightwise, has overrun said port 99, thus to allow further exhaust from port 99 which acts as an exhaust port during the time that piston 51c is moving rightwise. Thus is provided a channel for a slow leak of fluid from space 50 to provide a decelerating cushioned stopping means for piston 51c, so that piston 51c does not strike the solid metal of the cylinders head. Thus said slow leak eliminates objectionable hydraulic hammer to thus provide comparatively silent operation or to avoid damage.

It can be seen that at the time that channel 95 of piston 51c, in its movement rightwise, passes port 99 that no further exhaust from space 50 remains, therefore piston 51 is caused to stop at this point against remaining entrapped fluid within space 50.

It will be seen that piston 51c is arranged with a tapered face for engaging and lifting ball 52 of valve 560. Said action has been fully described elsewhere in this application.

It will be seen on FIG. 5 that the cylinder 230a may be provided in threaded engagement with an end closing means 231c, said closing means 231c being provided with a suitable packing gland 233 through which piston rod 82 emerges, however other suitable closing means may be arranged.

FIG. 6 is a view of one end of a cylinder 230a itself from FIG. 5 being in cross section, and illustrates the radially extending ports 99 shown on FIG. 5, also showing the arrangement of port 700 provided for ball 52 of valve 560, and also further *bypass* [by pass] port 171. Thus, said ports are shown in their relative position to each other.

Cylinder 230a shown on FIG. 6 will be understood to have arranged on its opposite end similar ports to those shown on FIG. 6, thus it will be understood that each end of cylinder 230a is a duplicate of said cylinders opposite end as well as are all other parts and functions of said opposite ends of said servo motor.

FIG. 7 illustrates a manually operable valve combination wherein functions of valves such as valve 21 and 41 of FIG. 2 are reproduced, yet wherein a manual control dependent on valve spool actuating rod by links 78a connected to a double throw lever 078 is used, said actuating rods being spaced in their connections to said lever 078 by a fulcrum 600 in such a way that each of said valve spools, 35c and 35d, in their reciprocative parallel movement is opposed to the other. Thus, each said spool moves in an opposite direction within their bores simultaneously when lever 078 is moved, in the same manner by total manual means rather than by a fluid column as was earlier described, thus to transpose two separate circuits of fluid at an identical time, as has already been described (see description of FIG. 2) in this application.

When said lever 078 is moved, this, together with fulcrum 600, reproduces the action of the moving column of oil which was described earlier in this application.

FIG. 7 will be seen as illustrating by numerical symbols the various channels, spools, lever, etc., designated in a similar manner, i.e., by numerical symbols, as was used elsewhere in this application describing valves having similar characteristics and similar objectives, but wherein said spools were hydraulically rather than mechanically moved.

Returning to FIG. 1, the cylinder head valves 560 and 570 are interconnected by the supplemental channel 16c, and the channel 16c is independent from the series of channels which operate the power outlets, since the channel 16c is connected directly to the pump line 16b. The channel 16c contains the full and constant pressure of the whole system at all times and the flow through this circuit serves the single purpose of automatically shifting the spools, 42 of valve 41, and 35 of valve 18, at the exact and proper time by using balanced fluid power rather than mechanical linkage to accomplish the shifting. Constant full pressure is maintained in channel 16c to balance the pressure which is present in the power cylinder 230 while it is under load, so that the pressure in cylinder 230 will not prematurely open valves 560 and 570. This construction also insures that the spools 42 and 35 will be made to shift at the proper moment when power piston 51 has reached its ultimate travel. Thus, the constant pressure holds the balls 54 closed on their seats at other times to thereby prevent the spool 42 of valve 41 and the spool 35 of valve 18 from shifting at an undesirable time. Thus, the fluid pressure will be sealed during the time that it is desired that the valves 560 and 570 be closed at pressure equalling the pressure within the power cylinder 230 by applying balancing power on the upper sides of balls 54, thus, full pressure is maintained on the balls 54 at all times through the channel 16c and it will be noted that the channel 16c leads to both valves 560 and 570 so that constant pressure is always present or existing upon both of these valves.

The balls 54 are normally urged into closing relation with respect to their seats by means of springs 55, and when the stem 53 is raised the corresponding spring 55 will be compressed. Said stem 53 moves through a closely fitted guide which thus is to prevent fluid movement therealong.

From the foregoing it is apparent that an engine operating off of a pressure medium such as hydraulic fluid has been provided. All valves are pressure balanced and the valve combination 18 and 41 is automatic, so that the direction of flow of fluid is reversed by the spools of valves 18 and 41 as said spools move automatically from one end of said valves bores to the other ends thereof.

The power cylinder 230, FIG. 1, has cylinder head valves 560 and 570 which cause the spools of the power reversing valve combination 18 and 41 to move, and said valves 560 and 570 may be used in single or in multiple on said cylinder to actuate one or more flow reversing valve combinations, to thereby actuate one or more power outlet cylinders simultaneously or at spaced intervals.

Cylinder head valves 560 and 570 are represented in threaded engagement with their corresponding cylinder heads on some of the drawings, but it is to be understood that said valves may be formed integral with the cylinder end or cylinder head which said valve or valves may serve.

The spool valve 41 is used for the exhaust of pressure from that pressure channel which forces the spool 35 of pressure [reersing] *reversing* valve 18 from one extremity of said valve 18 to the other. The control valve 4, FIG. 1, or the control valve 21, FIG. 2, can be manually actuated for controlling the flow of pressure to one or more sides of a piston or to the supply tank, as well as for actuating the flow transposing valve 40 shown on FIG. 2 and FIG. 3. The spaces 62a and 62b of valve 41, as well as the spaces 66 and 67 of valve 18, acts as a cushioning means for stopping the movement of said valves pistons or spools when said pistons overrun the exhaust ports 31, 30, 33, or 32, thus, before said pistons strike their cylinder heads so that there will be no shock during the operation of the engine. The space 50, FIG. 1, acts as a cushioning means for stopping the movement of power piston 51, FIG. 1, thus 51c, FIG. 5, before said power piston 51 strikes the cylinder head, so that there will be no shock during operation of the engine. Similar cushioning means may be employed in stopping the movement of valve spools as well. The engine can be operated by oil, steam, gas, or other pressure such as air, or can be actuated by a vacuum and is controlled by pressure balanced valves. By means of the present invention power can be transmitted from any suitable pressure medium such as fluid, or by using hydraulic oil or fluid, thus it is not necessary to use a large boiler so that the danger of explosion is eliminated. Further, by using oil, the moving parts are completely lubricated and surrounded by oil, and there is no possibility of foreign matter entering the working parts of this machine, thus, wear is practically non existent. Further, all moving parts of valves, etc., being totally inclosed, the danger of operator injury is eliminated. Yet again, there is no mechanical linkage to rob power, and the engine requires a minimum amount of attention, being provided with valves which are positive in their operation, thus [metering] *meting* exactly only the required quantity of fluid to accomplish their purpose without waste. Further, in the present invention, a rotative engine will not stall on dead center and in the event that the load becomes excessive (especially when the engine is not provided with valves 71 and 72, FIG. 1), it is only necessary to reduce the amount of load for the engine to start operating again.

It is to be further understood that valves 71 and 72, shown on FIG. 1, although desirable to meet special requirements, are not used or provided in every instance.

It is to be understood that the valve utilized in the present engine can be utilized for other purposes, wherein similar valves are desirable, than being incorporated in an engine such as that described. It is to be understood that no pressure other than atmospheric pressure is required in the supply tank. The pressure for operating the engine is generated by any suitable power source and by the pump which is the source of all pressure, and the pump's prime purpose is to produce circulation. Pressure exists in the accumulators if they are used. The automatic feature of the valves in combination is extremely important, and manual control is also possible. The engine may be governed with exceeding accuracy both as to frequency of power impulses as well as to the pressure at which power impulses are delivered.

It is to be understood that changes and alterations may be made, not [necessarily] *necessarily* following the drawings, and yet within the scope of the claims, even [through] *though* following out the principles of the invention.

The features which the applicant regards as his invention are set forth in the following claims.

I claim:

1. A fluid reciprocating engine comprising a power cylinder, a fluid powered piston dividing said cylinder into forward and rearward chambers and adapted to reciprocate longitudinally rearward and forward along a longitudinal path within said cylinder, pressure reversing valve means connected to the forward and rearward chambers of said cylinder and adapted to alternately apply pressure to the forward and rearward ends of said chamber for moving said piston alternately forward and rearward along said cylinder, said pressure reversing means comprising a housing and a spool, said housing having a longitudinal bore, said spool being contained within said bore and movable longitudinally therein for alternately supplying and exhausting fluid to said cylinder chambers, each end of said spool together with said housing defining opposing valve actuating chambers, reversing valve actuation means mounted on said cylinder and actuated by said power piston to alternately supply pressure to said valve actuation chambers at the end of the power piston movement in either its forward or rearward direction to shift said spool whereby said pressure reversing valve means will apply pressure to said forward cylinder chamber at the end of the forward movement of said piston to move said piston rearwardly, and will apply pressure to said rearward cylinder chamber at the end of the rearward movement to move said piston forwardly to thereby enable the piston to reciprocate forwardly and rearwardly along its longitudinal path continuously and automatically, exhaust valve means actuated by said valve actuation means for simultaneously exhausting the valve actuation chamber opposite that being supplied by said valve actuation means, fluid pump means for providing fluid under pressure to said reversing valve means and said valve actuation means, and main control means for interrupting communication between said pump and reversing valve means.

2. A fluid reciprocating engine according to claim 1 wherein said pressure reversing valve means includes a spring biased ball means mounted in said housing at each of said actuation chambers and in communication with said bore and allowing fluid from said actuation means to be delivered under pressure into said actuation chambers of said bore to alternately shift said spool.

3. A fluid reciprocating engine according to claim 2 wherein said spool of said pressure reversing valve means is provided with grooves, and said housing is provided with ports with fluid lines connecting said ports with the forward and rearward chambers of said piston cylinder, and said housing is further provided with ports communicating with said pump means, whereby when said spool is shifted by fluid under pressure in said actuation chambers, said grooves are alternately positioned so as to provide selective communication of fluid from said pump means alternately with said forward and rearward chambers of said piston cylinder.

4. A fluid reciprocating engine according to claim 1, wherein said valve actuation means comprises spring-biased ball and lifter actuation valves at each end of said power cylinder, and said piston including rod portions at its remote ends for alternatively engaging said ball lifter valve and raising said ball to actuate said valve and allow fluid to pass through said valve and thereby automatically reverse said pressure reversing means.

5. A fluid reciprocating engine according to claim 1, wherein manually operative adjusting valve means are provided for positioning and adjusting said reverse valve and said exhaust valve into proper relation for operation of said engine.

6. A fluid reciprocating engine according to claim 1, wherein overload valve means are provided for releasing fluid supplied by said fluid pump means when an excess amount of pressure is being delivered by said fluid.

7. A fluid reciprocating engine according to claim 1 which includes an intermediate reversal valve means, and fluid operating lines are provided from said actuation valve means to said exhaust and reversing valve means for actuating said exhaust and reversing valve means, which lines pass through said intermediate reversal valve, additional fluid control lines and connections connecting said main control valve with said intermediate reversal valve, said main control valve having means to reverse the flow from said main valve to said intermediate reversal valve for reversing the position of said intermediate reversal valve as well as means for reversing direciton of flow to said power piston, whereby said intermediate reversal valve will automatically reverse the stroke of the power piston so that the power piston may operate continuously in opposite direction upon reversal.

*8. A fluid reciprocating engine according to claim 1, wherein said fluid power piston is arranged having a sealing means for denying movement of fluid between said piston and said cylinder which said means is provided and arranged at the approximate longitudinal center of said piston, a distinct measurable extension of said power piston being provided and formed to extend longitudinally each way from said sealing means, an annular groove formed and arranged upon the circumference of each said measurable extension, a permanently open restricted passageway provided and arranged extending within the body of each said measureable extension from the face thereof, each said open restricted passageway being further arranged in permanent open communication with a respective said annular groove, each said annular groove being further arranged so as to alternately come into communication with a respective exhaust port from said power cylinder during the time that said fluid power piston is being reciprocated to thus alternately provide an exhaust channel from a said rearward chamber or a said forward chamber of said cylinder, thus said open restricted passageway being arranged to provide a slow leak from one or from the other said chambers into said exhaust.*

*9. A fluid reciprocating engine according to claim 8, wherein each said measureable extension of said power piston is further arranged in such a manner that each said measureable extension will alternately overrun a respective said exhaust port from said cylinder during the time that said fluid powered piston is being reciprocated to thus entrap residual fluid in a respective said forward or said rearward chamber of said cylinder to arrange a decelerating cushioned stopping means to the advance of said fluid powered piston.*

*10. A fluid reciprocating engine according to claim 1, wherein a continuing bypass channel is arranged to communicate from each respective said normal main inlet channel, thence into said forward or said rearward chamber of said power cylinder respectively, thus each said continuing bypass channel having therein arranged a spring pressed ball member and a seat therefor constituting a check valve, each said check valve being arranged to direct alternately said fluid pressure from a respective said normal inlet channel thence into a respective said forward chamber or a said rearward chamber of said cylinder to thus initially supply fluid pressure to one or to the other of said chambers.*

*11. A fluid reciprocating engine according to claim 1, wherein said exhaust valve means comprises a casing arrange with a longitudinal bore therein, a spool being contained in said bore and being movable longitudinally therein, said spool being arranged with means for alternately exhausting fluid from one or from the other of said valve actuating chambers of said pressure reversing valve means thence into exhaust, a valve spool shifter extension stem formed and arranged extending from each end of said spool and being formed in coaxial alignment thereto, a cylindrical space of lesser diameter than said named longitudinal bore being arranged at each end thereof respectively and in communication therewith, each said cylindrical space being formed and arranged as a continuation of said longitudinal bore and being arranged in longitudinal alignment thereto so that each said spool shifter extension stem will enter into or will retreat from a respective said cylindrical space during the time that said spool is being moved by fluid pressure in said longitudinal bore, each said cylindrical space being arranged and provided with a ball member and a seat therefor arranged therein, each said ball being arranged to be alternately elevated from its said seat at a time when a said spool shifter extension stem enters into its respective said cylindrical space, thus each said ball to be deposited upon its said seat at a time when said spool shifter extension stem retreats from its said cylindrical space to thus mete an exact amount of fluid into one or into the other end of said longitudinal bore of said exhaust valve means, each said cylindrical space being arranged in communication with a respective said reversing valve actuating means, also exhaust means provided and arranged for exhausting fluid from each end of said longitudinal bore of said exhaust valve means.*

References Cited by the Examiner

The following references, cited by the Examiner, are of record in the patented file of this patent or the original patent.

UNITED STATES PATENTS

| | | | |
|---|---|---|---|
| 1,880,727 | 10/32 | Blood | 121—157 |
| 2,000,805 | 5/35 | West et al. | 121—157 |
| 2,265,245 | 12/41 | Newman | 121—46.5 |
| 2,386,184 | 10/45 | Balsiger et al. | 121—158 |

FRED E. ENGELTHALER, *Primary Examiner.*